Figure 2:
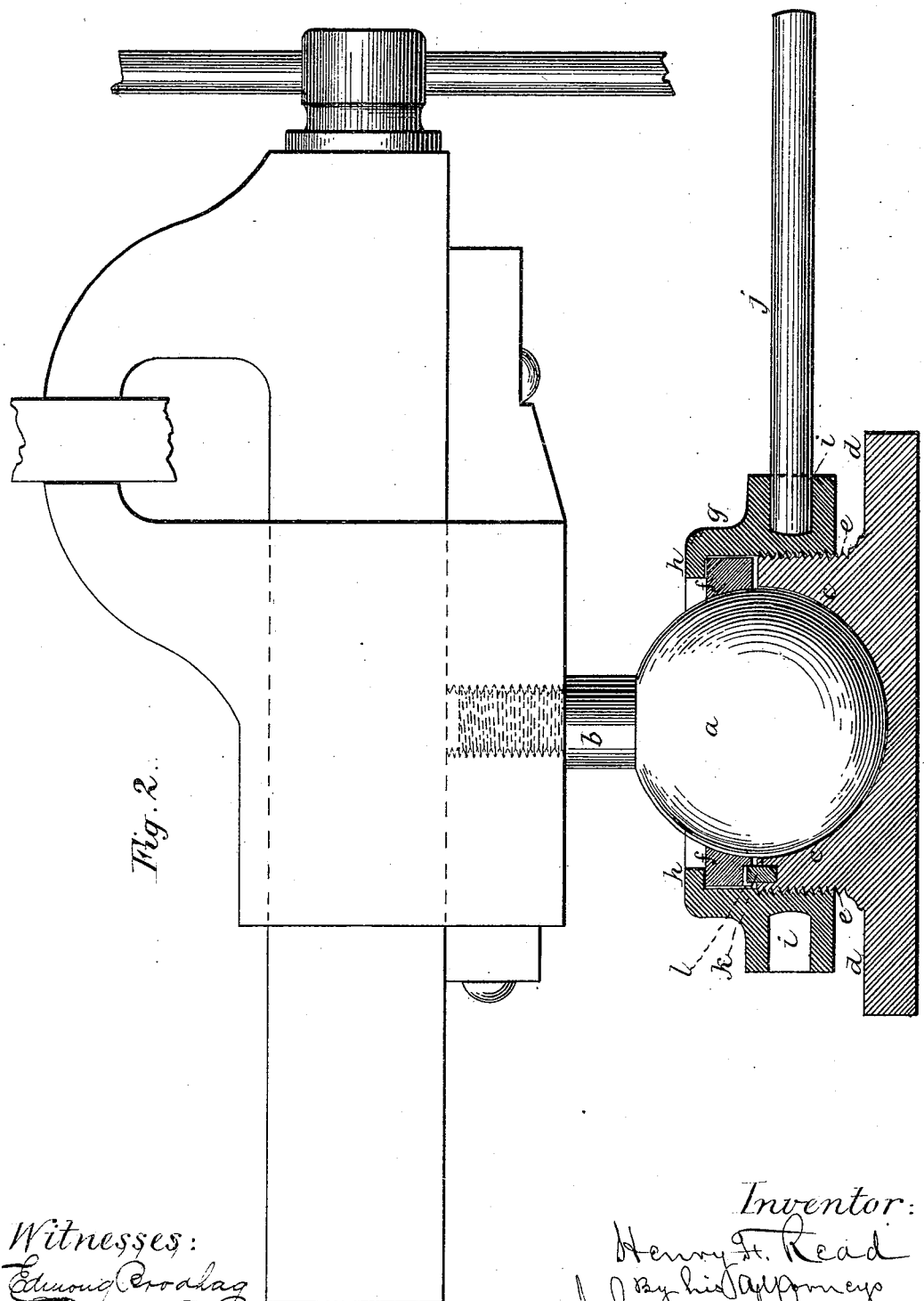

(No Model.) 2 Sheets—Sheet 1.
H. F. READ.
BALL AND SOCKET JOINT.
No. 269,708. Patented Dec. 26, 1882.
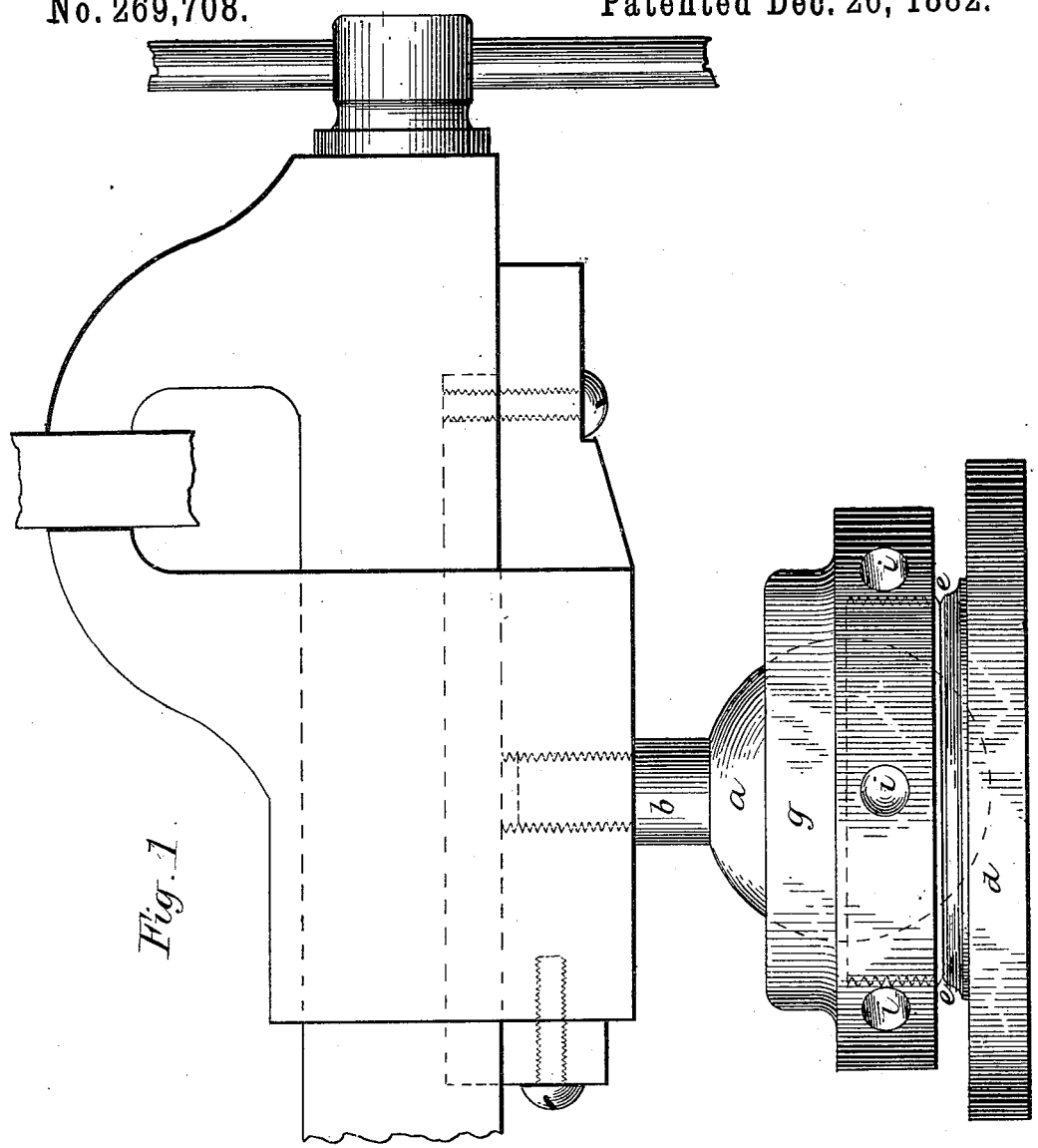
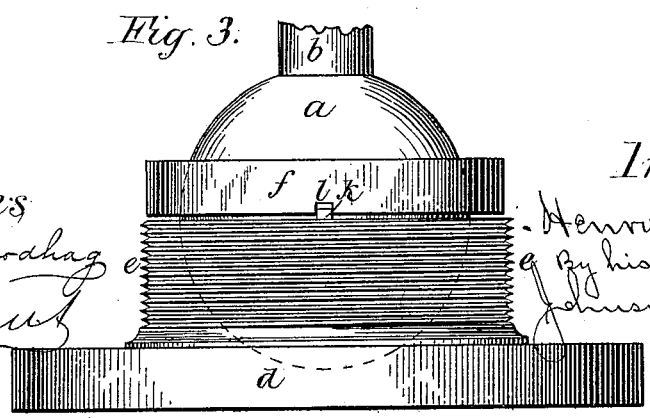
Witnesses
Edmund Brodhag
R. E. Grant
Inventor:
Henry F. Read
By his Attorneys
Johnson and Johnson (No Model.) 2 Sheets—Sheet 2.

H. F. READ.
BALL AND SOCKET JOINT.

No. 269,708. Patented Dec. 26, 1882.

Witnesses:
Edmund Crookag
R. E. Grant

Inventor:
Henry F. Read
By his Attorneys
Johnson and Johnson

UNITED STATES PATENT OFFICE.

HENRY F. READ, OF BROOKLYN, NEW YORK, ASSIGNOR TO READ, GLEASON & READ, OF SAME PLACE.

BALL-AND-SOCKET JOINT.

SPECIFICATION forming part of Letters Patent No. 269,708, dated December 26, 1882.

Application filed October 3, 1882. (No model.)

*To all whom it may concern:*

Be it known that I, HENRY FRANKLIN READ, a citizen of the United States, residing at Brooklyn, in the county of Kings and State of New York, have invented new and useful Improvements in Ball-and-Socket Joints, of which the following is a specification.

The ball-and-socket joint is used as a means for effecting a universal adjustment in various mechanisms; and my improvement is directed to a construction of such joint whereby it is rendered effective, durable, and of comparatively little cost. In such joint a divided socket is generally used as the seat and clamp for the ball, whereas by my improvement the socket has no clamping function and is not in sections. It is formed in a solid casting and receives only half of the ball, which is clamped by a top ring having its clamping-surface a segment of the circumference of the ball upon which it rests, so as to form a continuation of the socket, and is operated by an open-top screw-cap screwed upon the socket-casting so as to bring its interior top rim down upon the said clamping-ring, and thereby firmly clamp the ball in its socket and allow of the fullest range for adjustment of the mechanism carried by the ball. All the parts are cast, and the screw-cap has circumferential radial holes to receive the end of a hand-lever, by which to screw and unscrew the cap in making the desired adjustment.

The accompanying drawings represent in Figure 1 a side elevation of my improved ball-and-socket joint as applied to a parallel vise, in Fig. 2 a vertical section of the joint, and in Fig. 3 an elevation of the joint with the clamping-screw cap removed.

The ball or sphere *a* has a screw-stem, *b*, upon which the vise or other mechanism is mounted, the screw forming a convenient means for such attachment; or any other means of attachment may be provided to suit the mechanism. The socket *c* is formed in the raised part of a casting, *d*, which may be bolted to the bench or otherwise secured, according to the use of the joint. The socket forms a close joint with only half the circumference of the ball, so that the latter can be seated therein from its open top. The outer wall of the socket-casting, around the upper open part of the socket, is circular and has a screw-thread, *e*, cut thereon to receive an open-top screw-clamping cap. A clamping-ring, *f*, is seated upon the ball above the socket and receives the clamping action of the screw-cap. The bearing-surface of this clamping-ring is a segment of a circle coincident with the circumference of the ball, and the ring is thick enough to give the required strength and bearing-surface upon the ball. The circumference of the ring is slightly less than that of the threaded part of the socket and of the interior of the clamping-cap, and the area of the interior of the ring must be such as to cause it to rest upon the ball free of the top of the socket-casting, in order that it may have a clamping function upon the ball. The clamping-cap *g* has an interior screw-thread, which matches that of the socket-casting, is open at the top, and has an interior top rim, *h*, which extends over and forms a bearing upon the top surface of the clamping-ring. A slight turn of the screw-cap upon the socket-casting will be sufficient to clamp and to unclamp the intermediate ring with the ball, and the holding-power of the ring upon the ball is made very effective by screwing the cap down hard upon the clamping-ring. The screw-cap is formed with a series of circumferential radial holes, *i*, within which a hand-lever, *j*, is inserted to screw and to unscrew the cap, as may be required to set or adjust the mechanism carried by the ball.

The intermediate clamping-ring should be prevented from turning with the cap, and thereby prevent the turning of the mechanism when once adjusted, and for this purpose the clamping-ring is locked to the socket-casting by pins *k*, fixed in one part, entering notches *l* in the other part at the top of said socket-casting. This locked relation of the parts also prevents all tendency of the cap to unscrew while operating with the vise, as the clamping-ring, being non-turning, cannot communicate to the cap any force tending to turn the ball when clamped.

The open-top clamping-ring and the open-top clamping-cap give full range for adjusting the mechanism at any desired angle. In the clamping function of the locked ring it forms a section of the socket above the diameter-line of the ball and separated from the socket, and when forced down upon the ball binds it firmly in its socket by a vertical pressure only.

I claim—

1. The combination substantially herein described, in a ball-and-socket joint, of the non-clamping open-top socket with the ball, a clamping-ring seated thereon above its diameter-line free of said socket, and means, substantially such as described, for adjustably connecting said clamping-ring with the body of the socket to effect a vertical clamping force only upon the ball.

2. The combination substantially herein described of the ball provided with means for the attachment of mechanism with a non-clamping socket-casting having a circumferential screw-thread, a clamping-ring seated upon the ball above its diameter-line free of said socket, and means, substantially such as described, for adjustably connecting said clamping-ring with the body of the socket to effect a vertical clamping force only upon the ball.

3. In combination, in a ball-and-socket joint, the ball $a$, having the stem $b$, the socket-casting $d$, having a circumferential screw-thread, $e$, a non revolving clamping-ring, $f$, seated upon the ball above and free of said socket-casting, and an open-top screw-cap, $g$, having an interior screw-thread, an interior top rim, $h$, and circumferential radial holes $i$, all constructed and arranged to operate as described.

4. In combination, in a ball-and-socket joint, the ball $a$, the solid casting $d$, having the hemispherical cavity and the external screw-thread, the top clamping-ring, $f$, seated upon the ball, the screw-clamping cap $g$, and means, substantially such as described, whereby the said clamping-ring is locked with the socket-casting to render it non-revolving.

In testimony whereof I have hereunto set my hand in the presence of two subscribing witnesses.

HENRY F. READ.

Witnesses:
   JOS. A. BURR, Jr.,
   SAMUEL H. COOMBS.